United States Patent
Botros

(10) Patent No.: US 8,673,451 B2
(45) Date of Patent: *Mar. 18, 2014

(54) MULTILAYER THERMOPLASTIC STRUCTURES WITH IMPROVED TIE LAYERS

(75) Inventor: Maged G. Botros, Liberty Township, OH (US)

(73) Assignee: Equistar Chemicals, LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/218,560

(22) Filed: Aug. 26, 2011

(65) Prior Publication Data

US 2013/0052470 A1  Feb. 28, 2013

(51) Int. Cl.
*B32B 27/08* (2006.01)
*B32B 27/32* (2006.01)
*B32B 27/34* (2006.01)
*B29C 47/06* (2006.01)

(52) U.S. Cl.
USPC ........ 428/476.9; 428/500; 428/515; 428/520; 428/521; 428/523; 264/210.7

(58) Field of Classification Search
None
See application file for complete search history.

(56) References Cited

U.S. PATENT DOCUMENTS

| | | | |
|---|---|---|---|
| 4,619,972 A * | 10/1986 | Inoue et al. | 525/193 |
| 7,932,323 B1 | 4/2011 | Botros et al. | |
| 2005/0058845 A1 | 3/2005 | Bellet et al. | |
| 2007/0167569 A1 | 7/2007 | Botros | |
| 2010/0174036 A1 * | 7/2010 | Lee et al. | 525/74 |
| 2011/0159297 A1 | 6/2011 | Botros | |

FOREIGN PATENT DOCUMENTS

WO  WO 2009035885 A1 *  3/2009

OTHER PUBLICATIONS

PCT International Search Report and the Written Opinion—Mailed Jan. 29, 2013 for Corresponding PCT/US2012/052346.

* cited by examiner

*Primary Examiner* — Monique Jackson

(57) ABSTRACT

An oriented multilayer structure for shrink applications having a polymeric layer, a tie layer adhered to said polymeric layer. The tie layer is made up of the reaction product of a live, grafted polyolefin and an olefin elastomer. The multilayer structure is oriented and the tie layer provides strong adhesion to barrier layers even at high orientation levels.

15 Claims, No Drawings

MULTILAYER THERMOPLASTIC STRUCTURES WITH IMPROVED TIE LAYERS

FIELD OF THE INVENTION

The present disclosure relates to tie layers with improved interlayer adhesion in multilayer structures useful in film packaging. In particular the tie layers include a graft composition made up of the reaction product of a live, grafted polyolefin and an olefin elastomer. The multilayer structures with such tie layers are coextruded and have superior adhesion to the barrier layers and layers that are used in the multilayer structures. In addition, the present disclosure relates to multilayer structures that are oriented and are useful in thin film and heatshrinkable packaging applications.

BACKGROUND OF THE INVENTION

It is generally known to utilize thermoplastic multilayer structures, such as films, sheets or the like, to package products. For example, typical products packaged with thermoplastic multilayer structures include perishable products, such as food. Specifically, meats and cheeses are typically packaged in thermoplastic structures. Moreover, shrink films are known for packaging food products, such as meat and cheese.

When meat and cheese are packaged within thermoplastic multilayer structures the moisture barrier and oxygen properties are important. The oxygen barrier is obtained by using barrier resins such as EVOH and polyamides. Multilayer films, typically made by coextrusion, frequently include a polyolefin layer such as LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically ethylene-vinyl alcohol (EVOH) or polyamide resins such as nylon.

Tie-layer adhesives are used to bond polyolefins to dissimilar substrates in multilayer, co-extruded structures, particularly for blown and cast film, extrusion coating, blow molding, sheet extrusion, wire & cable, pipe, and other industrial applications. The tie-layer adhesive typically comprises a polyolefin base resin, which is the predominant component, and a grafted polyolefin. The grafted polyolefin is produced by reacting a polyolefin with an unsaturated monomer at elevated temperatures with or without a free-radical initiator. Commercially available tie-layer adhesives include Plexar® resins, product of Equistar Chemicals, LP, which are anhydride-modified polyolefins.

In addition to the base resin and grafted polyolefin, tie-layer adhesives commonly include other polymer resins or additives to provide better adhesion, clarity, or other benefits. Usually, there are tradeoffs. For instance, modifications that improve adhesion often reduce clarity, and vice versa.

Elastomers—random or block copolymers—are commonly included in tie-layer adhesive compositions to improve compatibility, increase adhesion, or impart other benefits. Styrene-based block copolymers, for instance, have been used to improve adhesion in multilayer constructions that require bonding of polyethylene to a styrenic polymer (U.S. Pat. Appl. Publ. Nos. 2007/0071988 and 2007/0167569).

Other commonly used elastomers include olefin elastomers, such as ethylene-propylene rubber (EPR) or ethylene-propylene-diene monomer rubber (EPDM). Many references teach to blend an olefin elastomer with other tie-layer adhesive components (see, e.g., U.S. Pat. Appl. Publ. Nos. 2004/0097637, 2008/0032148, 2009/0035594, and 2010/0174036), but none of these references suggests reacting the olefin elastomer with the grafted polyolefin during the manufacture of the grafted polyolefin.

Clarity of multilayer films is often an issue, particularly for the food packaging industry. Wraps for meat and cheese, snack foods, baking mixes, and many others uses require barrier layers (e.g., EVOH, polyamides, polyolefins) to prevent transmission of oxygen and/or moisture, and making such structures with high clarity poses a formidable challenge. Additives, such as the bicyclic modifiers of U.S. Pat. Appl. Publ. No. 2007/0054142, are sometimes employed to improve clarity without sacrificing adhesion.

U.S. Pat. Appl. Publ. No. 2010/0174036 teaches that tie-layer adhesives useful for multilayer films having a favorable balance of clarity and adhesion can be made by blending, in sequence, a grafted ("maleated") polyolefin, a polyolefin elastomer, and LLDPE. Again, there is no suggestion to react the polyolefin elastomer with the grafted polyolefin.

U.S. Pat. Appl. Publ. No. 2004/0175465 teaches that multilayer structures can be made by coextrusion of several layers including tie layers. The tie layers used are anhydride modified LLDPE. Further, there is no suggestion of the tie layers contain reaction products of olefin elastomer with the grafted polyolefin.

U.S. application Ser. No. 12/924,540 discloses a graft composition useful for tie-layer adhesives and multilayer structures having improved adhesion and clarity, where the graft composition contains an LLDPE and the reaction product of a live, grafted polyolefin and an olefin elastomer.

Improved tie-layer adhesive compositions suitable for use in making multilayer structures with good adhesion and high clarity are needed. A valuable approach would avoid expensive additives and performance tradeoffs. Ideally, improved tie-layer adhesives could be made using economical starting materials, commonly used equipment, and familiar techniques. Further, coextruded multilayer structures that are oriented to provide packages that are heat shrinkable are also needed.

SUMMARY OF THE INVENTION

In one aspect, the present disclosure provides for an oriented multilayer structure for shrinkwrap comprising a polymeric layer and a tie layer adhered to the polymeric layer wherein the tie layer comprises the reaction product of a live, grafted polyolefin and an olefin elastomer. In another aspect oriented multilayer structures are prepared by co-extrusion or a bubble process.

DETAILED DESCRIPTION OF THE INVENTION

Graft compositions of the present disclosure comprise reaction products of a live, grafted polyolefin and an olefin elastomer.

The expression "grafted polyolefin" as used herein refers to a polyolefin grafted with an unsaturated monomer, typically an unsaturated polar monomer, preferably containing one or more oxygen atoms. Preferred examples of such unsaturated monomers will be given hereinafter.

By "live, grafted polyolefin," we mean a grafted polyolefin that can further react with added olefin elastomer and any residual polyolefin, unsaturated monomer, and/or free-radical initiator used to make the grafted polyolefin.

Live, grafted polyolefins suitable for use in making the graft compositions are manufactured by reacting polyolefins with unsaturated monomers at elevated temperatures, with or without a free-radical initiator, under conditions effective to graft unsaturated monomer units onto the polyolefin backbone.

Polyolefins suitable for making the live, grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified poly-propylenes, and the like, and blends thereof. Preferred polyolefins for making the grafted polyolefin are polyethylenes, particularly HDPE and LLDPE, and especially HDPE.

An unsaturated monomer reacts with the polyolefin to produce the grafted polyolefin. Suitable unsaturated monomers are also well known. Preferred unsaturated monomers are ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. Appl. Publ. Nos. 2004/0097637 and 2007/0054142, the teachings of which are incorporated herein by reference.

The relative amounts of unsaturated monomer and polyolefin used will vary and depend on factors such as the nature of the polyolefin and unsaturated monomer, reaction conditions, available equipment, and other factors. Usually, the unsaturated monomer is used in an amount within the range of 0.1 to 15 wt. %, preferably from 0.5 to 6 wt. %, and most preferably from 1 to 3 wt. %, based on the amount of live, grafted polyolefin produced.

Grafting is accomplished according to known procedures, generally by heating a mixture of the polyolefin and unsaturated monomer(s). Most typically, the grafted polyolefin is prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting step. A free-radical initiator such as an organic peroxide can be employed but is not necessary.

Grafting of the unsaturated monomer and polyolefin to generate the live, grafted polyolefin is performed at elevated temperatures, preferably within the range of 180° C. to 400° C., more preferably from 200° C. to 375° C., and most preferably from 230° C. to 350° C. Shear rates in the extruder can vary over a wide range, preferably from 30 to 1000 rpm, more preferably from 100 to 600 rpm, and most preferably from 200 to 400 rpm.

Commercially available grafted polyolefins are not "live" because the free-radical content has reacted out or has been quenched during workup of the product, typically during pelletization. A live, grafted polyolefin contains active free-radical species generated thermally by visbreaking or from peroxide decomposition. The residual radical content allows reaction to continue upon combination of the freshly made grafted polyolefin, usually while still molten, with an added olefin elastomer. One or more of the grafted polyolefin, olefin elastomer, residual polyolefin, and residual unsaturated monomer may be involved in this secondary reaction.

Thus, in the second process step for making the graft composition, the live, grafted polyolefin (and any residual polyolefin and/or unsaturated monomer) is reacted with an olefin elastomer. This reaction can be performed using any suitable reactor. Conveniently, the reaction is performed by combining the freshly prepared live, grafted polyolefin with the olefin elastomer in a shear-imparting extruder/reactor as described earlier. In one particularly preferred approach, the live, grafted polyolefin is transferred while still molten from an outlet of a first extruder directly to a second extruder in which a reaction with the olefin elastomer occurs.

The amount of olefin elastomer used depends on the nature of the elastomer and grafted polyolefin, the desired tie-layer properties, reaction conditions, equipment, and other factors. Generally, however, the amount of elastomer used will be in the range of 5 to 60 wt. %, more preferably from 20 to 50 wt. %, and most preferably from 30 to 40 wt. %, based on the amount of graft composition produced.

The live, grafted polyolefin and the olefin elastomer react at elevated temperature, preferably at temperatures within the range of 120° C. to 300° C., more preferably from 135° C. to 260° C., and most preferably from 150° C. to 230° C. Preferably, the temperature for the reaction used to make this graft composition is lower than that used to make the live, grafted polyolefin. Shear rates in the extruder for this step can vary over a wide range, preferably from 30 to 1000 rpm, more preferably from 100 to 600 rpm, and most preferably from 200 to 400 rpm.

The resulting graft [polyolefin/elastomer] composition is conveniently quenched and pelletized at this point, but it can be combined immediately after preparation with base resin as is described further below.

Suitable olefin elastomers include ethylene-propylene rubber (EPR), ethylene-propylene-diene monomer rubber (EPDM), the like, and mixtures thereof. As used herein, "elastomer" refers to products having rubber-like properties and little or no crystallinity. Preferably, the olefin elastomers contain from 10 to 80 wt. % of ethylene recurring units. More preferred olefin elastomers contain from 10 to 70 wt. % of ethylene units. Commercially available olefin elastomers include Lanxess Corporation's Buna® EP T2070 (68% ethylene, 32% propylene); Buna EP T2370 (3% ethylidene norbornene, 72% ethylene, 25% propylene); Buna EP T2460 (4% ethylidene norbornene, 62% ethylene, and 34% propylene); ExxonMobil Chemical's Vistalon® 707 (72% ethylene, 28% propylene); Vistalon 722 (72% ethylene, 28% propylene); and Vistalon 828 (60% ethylene, 40% propylene). Suitable ethylene-propylene elastomers also include Exxon-Mobil Chemical's Vistamaxx® elastomers, particularly grades 6100, 1100, and 3000, and Dow Chemical's Versify® elastomers, particularly grades DP3200.01, DP3300.01, and DP3400.01, which have ethylene contents of 9, 12, and 15 wt %, respectively. Additional EPDM rubbers include Dow's Nordel™ hydrocarbon rubber, e.g., the 3722P, 4760P, and 4770R grades.

It was surprisingly found that high grafting efficiencies can be achieved when live, grafted polyolefins are further reacted with an olefin elastomer. Normally, polyolefin grafting proceeds less than quantitatively. For instance, in a typical process for grafting maleic anhydride onto high density polyethylene, the efficiency usually ranges from 80 to 85%. In contrast, nearly quantitative conversion of the unsaturated monomer can be accomplished when a live, grafted polyolefin is further reacted with an olefin elastomer.

Preferably, at least 90 wt. %, more preferably at least 95 wt. %, and most preferably at least 98 wt. %, of the unsaturated monomer is incorporated into the graft composition. The amount incorporated can be measured by wet chemical methods (titration, etc.) or more preferably by Fourier transform infrared spectroscopy (FTIR) according to methods that are well known in the art.

The graft composition preferably exhibits a weak but characteristic absorption, possibly a carbonyl absorption, in the infrared spectrum within the range of 1700 to 1750 cm$^{-1}$, preferably from 1725 to 1735 cm$^{-1}$, and most preferably at approximately 1730 cm$^{-1}$.

The graft composition is a valuable component of a tie-layer adhesive. Tie-layer adhesives disclosed herein comprise from 2 to 50 wt. % of the graft [polyolefin/elastomer] and from 50 to 98 wt. % of a base resin (also called a "let-down" resin). More preferred tie-layer adhesives comprise from 5 to 30 wt. % of the graft composition and from 70 to 95 wt. % of the base resin. Most preferred adhesives comprise from 15 to 25 wt. % of the graft composition and from 75 to 85 wt. % of the base resin. An advantage of the graft compositions, elaborated upon later, is the ability to use a relatively low concentration in the tie-layer adhesives while achieving good adhesion and high clarity in demanding applications such as high orientation application.

Suitable base resins for the tie-layer adhesives include ethylene homopolymers; copolymers of ethylene with $C_3$-$C_8$ α-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include LDPE; MDPE; HDPE; LLDPE; very low density polyethylene; ultra low density polyethylene; ethylene-vinyl acetate (EVA) copolymers; ethylene-acrylate copolymers such as ethylene-ethyl acrylate copolymer and ethylene-n-butyl acrylate copolymers; and blends thereof.

LLDPE is a preferred base resin. In particular, the LLDPE is preferably a copolymer of ethylene and 1-butene, 1-hexene, or 1-octene. Preferably, the LLDPE has a density within the range of 0.895 to 0.925 g/cm$^3$ and a melt index ($MI_2$) within the range of 0.5 and 5 g/10 min, more preferably from 0.8 to 2.5 g/10 min. Suitable LLDPE base resins include the Petrothene® GA502, GA503, GA602, and GA616 series resins, which are products of Equistar Chemicals, LP.

In a preferred aspect, the process for making the graft [polyolefin/elastomer] composition is integrated with a process for making the base resin. In this process, freshly made polyethylene powder (e.g., LLDPE) is blended in line with the graft composition to generate a mixture that is useful as a masterbatch or as a tie-layer adhesive. The graft composition can be in the form of pellets or it can be combined with the base resin powder immediately after the graft composition is produced. In either case, the "in-line" process affords products with reduced thermal history and, frequently, improved properties (see U.S. Pat. No. 7,064,163, the teachings of which are incorporated herein by reference).

In addition to the base resin and the graft composition, the tie layer adhesive can include other commonly used components, including adhesion promoters, elastomeric polymers, UV inhibitors, antioxidants, thermal stabilizers, and the like. For some examples of these, see U.S. Pat. Appl. Publ. No. 2004/0097637, the teachings of which are incorporated herein by reference.

A particularly preferred tie-layer adhesive comprises from 5 to 30 wt. %, preferably from 15-25%, of a particular graft composition and 70-95 wt. %, preferably 75-85 wt. %, of LLDPE as the base resin. This graft composition is made by grafting maleic anhydride onto HDPE, followed by further reaction of the live, grafted polyolefin with EPR or EPDM, particularly EPR. Such compositions provide good adhesion and high clarity with less grafted material than is commonly needed when EPR or EPDM is simply blended with a grafted HDPE (see, e.g., Examples 1-4 and Comparative Examples 5-11, below).

The tie-layer adhesives are valuable for bonding dissimilar materials in multilayer constructions, particularly films, sheets, pipes and other products. In particular, the adhesives are useful for bonding plastic, wood, glass, paper, composite, and metal substrates. They can be used in lamination, extrusion (or coextrusion), sheet extrusion, extrusion coating, injection molding, blow molding, melt thermoforming, and other processes.

The adhesives are particularly valuable for making multilayer films and sheets, including barrier films. The multilayer films have at least two layers in addition to the adhesive layer, which bonds the other layers together. Usually, at least one layer serves as a barrier layer. Multilayer films, typically made by coextrusion, frequently include a polyolefin layer such as LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically ethylene-vinyl alcohol (EVOH) or polyamide resins such as nylon.

Multilayer barrier films are widely used for food packaging, and in most of these applications, clarity and high adhesion are important. Food packaging applications include formed bags, pouches, and casings for packaging meat and poultry products. They can also be used for snack foods, cereals, baking mixes, and the like. They may also have utility for cook-in packaging.

Analysis of the interface between the adhesive and barrier layers in multilayer barrier structures reveals interesting attributes of the inventive tie layers. Scanning electron microscopy (SEM), for example, shows intimate, almost seamless bonding at the adhesive-EVOH interface. When a blend of grafted HDPE and EPR is used instead to make the adhesive, the interface is raised and more distinct. Differences are also apparent when atomic force microscopy (AFM) is used to analyze the interface. The inventive tie layers can provide a smooth, undisturbed, nearly flawless interface that is consistent with good adhesion and high clarity. In contrast, when a blend of grafted HDPE and EPR is used to make the adhesive, AFM shows that the interface includes a discrete inter-phase region between the adhesive and barrier layers that is consistent with good adhesion but may also contribute to lower clarity.

Tie-layer adhesives of the present disclosure can be used in numerous multilayer barrier film constructions, including structures having five, seven, nine, eleven or more layers. Illustrative multilayer constructions include the following where "FCL" represents a food contact layer such as LDPE, LLDPE, EVA, ethylene-acrylic acid or ester copolymer, ethylene-methacrylic acid or ester copolymer, ionomers or the like:

HDPE/adhesive/EVOH/adhesive/HDPE
   HDPE/adhesive/polyamide/adhesive/HDPE
   EVOH/adhesive/HDPE/adhesive/EVOH
   LDPE/adhesive/polyamide/adhesive/FCL
   LDPE/adhesive/EVOH/adhesive/FCL
   LLDPE/adhesive/EVOH/adhesive/FCL
   LLDPE/adhesive/polyamide/adhesive/FCL
   HDPE/adhesive/EVOH/adhesive/FCL
   HDPE/adhesive/polyamide/adhesive/FCL
   Some commonly used sealable film constructions include:
   LLDPE/adhesive/EVOH/adhesive/sealant
   HDPE/adhesive/polyamide/adhesive/sealant
   HDPE/adhesive/EVOH/adhesive/sealant
where the sealant layer is, for example, EVA, LLDPE or ionomer.

Prior to shrinkage the multi-layer structures have a thickness of from about 150 micron to about 700 microns, alternatively from about 250 microns to about 600 microns, alternatively from about 300 microns to about 550 microns alternatively from about 450 microns to about 525 microns. Additionally, the external layers on each side are each from 5% to 47% of the thickness, alternatively from 10% to 45%, alternatively from 15% to 43%, alternatively from 25% to 40%, alternatively from 30 to 35% of the total thickness of the structure and can have a thickness the same or independent from one another. The internal layers may be from 1 to 25%, alternatively from 2 to 20%, alternatively from 3% to 15%, alternatively from 4% to 10%, alternatively, 4 to 7% of the total structure thickness and each internal layer may be the same thickness or have a thickness independent from one another. It will be understood that the aforementioned ranges can be used in different combinations and furthermore, individual points within the ranges can be selected.

Heat shrinkable thermoplastic multilayer structures can be made using the tenter frame process. In the tenter frame process the polymer is extruded as a film directly onto a chilled roller and the film is then passed through a stretching unit by rollers moving faster than the rate at which the polymer is extruded. This orients the film in the machine direction (MD). The film is then fed into a tenter frame for transverse direction orientation. In the tenter, the film is gripped along each edge by clamps that are attached to moving chains. These move outwards to stretch the film in the transverse direction (TD). After stretching, the film is heat-set to hold the orientation and then reeled up. The simultaneous orientation provides balance mechanical characteristics. Biaxial film orientation greatly improves film's tensile strength, flexibility, and toughness. Orientation also enables the films to be used for heat-shrinking applications.

Multilayer structures of the present disclosure have orientation with preferential orientation in the direction that receives the most stretch as the film is formed or processed. The resulting film shrinks preferentially in the direction that is stretched more as the film is manufactured. Shrinkage is preferentially machine direction orientation (MDO) if more stretch is applied to the MD than to the TD, and transverse direction orientation (TDO) if more stretch is applied transverse than machine direction. Preferential TDO causes a film of the present disclosure to shrink primarily in the TD upon application of heat, for instance in a sleeve label. Preferential MDO results in greater shrink in the machine direction than in the TD as is usually used for roll-on shrink-on labels.

Multiple bubble blown film processes can be used to manufacture of heat shrinkable thermoplastic multilayer structures. Simultaneous bi-axial orientation of polymeric films can be achieved by these processes and provides for balance of mechanical properties. Multiple bubble processes are described in U.S. Pat. Nos. 6,824,734, 3,456,044 and 6,764,753 which are incorporated by reference in their entirety. Manufacturers which commercially employ the multiple bubble processes include Kuhne Group.

Advantageously, the multiple bubble process including the double bubble and triple bubble processes provide multilayer structures with reduced thermal history and improved properties of the packaged product. When symmetric stretching of the film occurs the produced film can have isotropic properties of the final film both in MD and in TD. Product characteristics and mechanical properties can also be altered by crosslinking in bi-axially oriented films.

Triple bubble, and other multiple bubble processes for preparing a multilayer structure for shrinkwrap involve inflating a multilayer film to form successive bubbles to obtain a particular orientation. For example, the process can begin by extruding polymeric pellets such as polyethylene, and/or various other polymers to be formed into layers disclosed herein through a die to form an initial tube. The tube is inflated by gas pressure to a desired orientation (i.e. diameter) and drawn through a cooling ring by nip rollers. The nip rollers also serve to collapse the tubing and retain air in the inflated portion. The cooling ring can serve to pass cooling air to the external surface of the tube. The tube can then be passed through additional nip rollers into a heating area where the tube is heated and reinflated. The tube is also cooled and passed through another set of nip rollers to exit the second reinflation area. This additional set of nip rollers can also be set to pull the tubing at a faster rate than the earlier set of rollers in order to impart a desired orientation to the tubing. The temperatures employed for heating and cooling the layers depend on the softening point of the polymers used.

Additional areas can be set up in this way to include any number of bubbles, including a single bubble, two or three or more bubbles. This way the desired orientation can be imparted. The tube or film can also be expanded and then subject to an annealing step.

One embodiment of a multilayer structure for shrink applications comprises first and second outer layers, at least one barrier layer, first tie layer disposed between the first outer layer and the barrier layer; and a second tie layer disposed between the second outer layer and the barrier layer. The outer layers can comprise a material comprising a material selected from the group consisting of polyolefins, ionomers, and blends thereof; and the barrier layer can be a polar polymer and can be selected from the group consisting of ethylene vinyl alcohol (EVOH), ethylene vinyl acetate (EVAC), polyamide(PAM) and blends thereof. These layers are coextruded together in multiple bubble process to form said multilayer structure that is biaxially oriented.

However, when the multi layer structures are prepared using the triple bubble process the selection of tie layers are significant as delamination of the co-extruded layers can occur. It has been surprisingly found that choosing tie layers formed from a reaction product of a live, grafted polyolefin and an olefin elastomer gave good adhesion between polar polymers used in barrier layers, non-polar polymers and tie layers containing HDPE/elastomer grafted with maleic anhydride as described hereinabove. Multi layer structures comprising the tie layers of the present disclosure produce good adhesion to polar barrier layers as measured by T-Peel adhesion according to ASTM D1876 at room temperature and after soaking in hot water test at 95° C. for structures containing EVOH and at 75° C. for polyamides containing structures.

Films as disclosed herein made using the tenter process have an MDO or TDO ratio (ratio of oriented length to un-oriented length in the direction most stretched, MD or TD, respectively) of 1:1, alternatively about 3:1, alternatively about 4:1, alternatively about 5:1, alternatively about 6:1. Distinct from the tenter process, blown films formed using the multi-bubble process will be equal in all directions. The films of the present disclosure can have orientations of at least a 4× orientation, alternatively a 6× orientation, alternatively a 10× orientation, alternatively a 20× orientation, alternatively a 25× orientation, alternatively a 30× orientation.

In some embodiments, the films demonstrate a minimal opposite directional shrinkage or growth at 110° C., preferably at 100° C. of at most about 7 percent, more preferably at most about 5 percent, most preferably at most about 3 percent in the direction of least shrink. The shrinkage (MDO ratio and TDO ratio) is measured according to ASTM method D-1204, by using an oriented film sample 4" (10.16 cm) in both MD and TD (that is, square samples). Sample is placed in a heated air oven at 120° C. for 10 minutes and MD and TD dimensions are measured again. The ratio of pre-to-post-heated MD and TD dimensions correspond to MDO ratio and TDO ratio, respectively.

The following examples are merely illustrative. Those skilled in the art will recognize many variations and embodiments may be used and still be consistent with the present disclosure.

Component (A): Graft-1 [HDPE/EPR] Composition

Graft-1 is a live, grafted polyolefin produced by feeding a high-density polyethylene (density: 0.957 g/cm$^3$) and maleic anhydride (2.2 wt. % based on total charged reactants) to a first COPERION® ZSK-92 twin-screw extruder having zones heated at temperatures ranging from 450° F. to 660° F. (230 to 350° C.) and operated at shear rates within the range of 200 to 400 rpm to produce a live, grafted polyolefin. After reaction, the live, grafted polyolefin will have an incorporated maleic anhydride content of 1.9 wt % and an MI of 9 g/10min.

Graft-1 exits the first extruder and immediately enters a second ZSK-92 twin-screw extruder, where it is combined and reacted with an ethylene-propylene rubber, namely EPR-1. EPR-1 is Vistalon® 722 (product of ExxonMobil Chemical having 72 wt. % ethylene recurring units. Conditions in the second extruder: temperature range: 300° F. to 450° F. (150 to 230° C.); shear rate: 200 to 400 rpm. The resulting graft [HDPE/EPR] product is cooled and pelletized.

Graft component (A-1) is formed by this process where Tie Layer 1 is formulated with 20 wt. % of Graft component (A-1) (Graft-1 and 25% EPR-1).

Component (B): Base Resin

As illustrated in the examples summarized herein, component (B) can be a base resin. The base resin can be a linear polyethylene. In these examples, LLDPE-1 employed is the linear low density polyethylene PETROTHENE® GA602050. GA602050 is a pelletized hexene copolymer linear low density polyethylene (density: 0.917 g/cm3; Melt Index, M12: 2.0 g/10 min.).

Component (C): Additives

As illustrated in the examples provided herein, Component (C) can be one or more additives. For example, IRGANOX® 1010, IRGANOX® 1076 and IRGAFOS® 168 are employed as antioxidants. IRGANOX® 1010 and IRGANOX® 1076 are sterically-hindered phenolic antioxidants available from CIBA. IRGAFOS® 168 is a trisarylphosphite processing stabilizer also available from CIBA.

EXAMPLE 1

Tie Layer 1

Tie-Layer Adhesives from Composition (A-1)[HDPE/EPR]

The pelletized graft [HDPE/EPR] composition (A-1) is melt blended at 20wt % in an extruder at 200-240° C. and 210-250 rpm with Irganox 1010 antioxidant (0.1 wt. %), Irgafos 168 antioxidant (0.1 wt. %), and LLDPE-1 (balance to 100 wt. %) to produce a tie-layer adhesive. This composition can be referred to as Tie layer 1.

Comparative Tie layer 2

Tie-Layer Adhesives from Blends of Grafted HDPE, EPR and LLDPE

Graft-1 (12wt %) is blended with Irganox 1076 (0.16 wt. %), Irgafos 168 (0.1 wt. %), pellets of LLDPE-1 and pellets of EPR-1 (20wt %), where Graft-1 is no longer a live polymer. Accordingly, non-live Graft-1 has been quenched or reacted out and worked up to a final form prior to blending. The dry mixture is melted and mixed in the extruder (200-240° C., 210-250 rpm).

Table 1 as follow shows the composition of Tie layer 1 and comparative tie layer 2:

TABLE 1

| Components | Tie Layer 1 | Comparative Tie Layer 2 |
|---|---|---|
| Graft Component (A-1) Extruded Graft-1 + V722 (25 wt %) | 20 | 0 |
| Graft-1 | 0 | 12 |
| EPR-1 | 0 | 20 |
| (B) LLDPE-1 | 79.8 | 67.74 |
| (D) IRGANOX ® 1076 | 0 | 0.16 |
| (D) IRGAFOS ® 1010 | 0.1 | 0 |
| (D) IRGAFOS ® 168 | 0.1 | 0.1 |

As can be seen, the significant difference between Tie layer 1 and comparative Tie layer 2 is that in the formation of Tie Layer 1, components Graft-1 and EPR-1 are reacted together prior to combining with the LLDPE-1 base resin. In comparative Tie Layer 2, the Graft-1 and EPR-1 are blended together with LLDPE-1 and the other components.

Preparation of Multi-Layer Films and Sheets

Two five-layer sheets are produced using the tie-layer adhesives of Tie Layer 1 and comparative Tie Layer 2. Each multilayer film, having an overall thickness of 525 micron, was formed using a Killion extruder having the 5 layer structure (respective percentages being based on total film thickness):
LLDPE (30%)/Tie Layer (10%)/EVOH (20%)/Tie layer (10%)/LLDPE (30%).

The Ethylene-vinyl alcohol copolymer (EVOH) is Soarnol® H4815 grade, product of Nippon Gohsei® Kagaku K.K., Japan. The final film thickness after orientation is 25 μm.

Each multilayer film was made on a Killion extruder (comprised of 3 extruders in this case) with a barrel length to barrel diameter (L/D) ratio of 24:1, a barrel diameter of about 1 to 1.25 inches, and 3 barrel heating zones.

TABLE 2

| Extruder | | | |
|---|---|---|---|
| Extruder | Barrel Diameter | L:D Ratio | Heating Zones |
| Extruder 1 | 1.25 inches | 24:1 | 3 |
| Extruders 2 & 3 | 1 inch | 24:1 | 3 |

After extrusion, each of the multi-layer structures were then biaxially oriented using a line tenter frame process. These were stretched in a 3× in the machine direction and 7× in the transverse direction for a 21× orientation.

Testing of Multi-Layer Films

The Film samples are tested for adhesion according to ASTM D1876. The force required to separate the film apart in a T-peel configuration at 25.4 mm (10 inches)/min is measured using an Instron® tensile tester. The average adhesion of five specimens is recorded as the peel strength in N/cm. Adhesion values are reported in Table 3.

TABLE 3

| Test | Tie Layer 1 | Comparative Tie Layer 2 |
|---|---|---|
| Adhesion Value (N/cm) | Inseparable | 1.5 |

Films formed from Triple Bubble Process

Tie layer 3 was formed in the same manner as Tie layer 1, except that Graft-2 (which grafted HDPE was used) was employed rather than Graft 1. Graft-2 is a live, grafted polyolefin produced by feeding a high-density polyethylene (density: 0.957 g/cm$^3$) and maleic anhydride (2.0 wt. % based on total charged reactants) to a first COPERION® ZSK-92 twin-screw extruder having zones heated at temperatures ranging from 450° F. to 660° F. (230 to 350° C.) and operated at shear rates within the range of 200 to 400 rpm to produce a live, grafted polyolefin. Accordingly, Graft-2 is further reacted with EPR-1 (25 wt %) to form tie layer component (A-2).

Tie Layer 3 has the same composition as Tie Layer 1, with 20 wt % component (A-2), 79.8 wt % LLDPE-1 and 0.1 wt % Irgafos® 1010 and 0.1 wt % Irgafos® 168.

Comparative Tie layers 4 and 5

Tie-Layer Adhesives from Blends of Grafted HDPE, EPR and LLDPE

Graft-2 is blended with antioxidants, pellets of LLDPE, and pellets of EPR as noted in Table 4. The dry mixture is melted and mixed in the extruder (200-240° C., 210-250 rpm).

TABLE 4

| Components | Comparative Tie Layer 4 | Comparative Tie Layer 5 |
|---|---|---|
| Graft-2 | 12% | 10.5% |
| Butene LLDPE (2 MI) | 67.74% | 0 |
| EPR (72 wt % Ethylene) | 20% | 15% |
| Butene LLDPE (3.5 MI) | 0 | 39.35% |
| Hexene LLDPE (7.0 MI) | 0 | 30% |
| Ethylene octene copolymer (density = 0.860 g/cc and MI = 0.500 g/10 min) | 0 | 5% |
| Irganox 1076 | 0.16% | 0 |
| Irganox 1010 | 0 | 0.075% |
| Irgafos 168 | 0.1% | 0.075% |

The Tie layer 3 and comparative tie layers 4 and 5 were used to form multi-layer structure (1) having a thickness of 460 micron as follows (respective percentages being based on total film thickness):
LLDPE (43.5%)/tie (4⅓%)/EVOH (4⅓%)/tie (4⅓%)/LLDPE (43.5%)

Additionally, multi-layer structure (2) was formed in the same way except that Ionomer was used in place of EVOH layer. Multi-layer structure (3) was formed in the same way except that Polyamide was used in place of EVOH for the barrier layer.

A Triple Bubble process was used for forming the multilayer structure. Accordingly, the tie layer pellets are fed to the process where the layers are extruded together and then stretched in the bubble process, using three successive bubbles. Multi-layer structure 2 was additionally subject to annealing. As it is a triple bubble process, the orientation is equal in all directions.

The degree of adhesion of each multi-layer structure was tested before and after soaking in water bath at 95° C. or 75° C. with results shown in Tables 5 and 6 respectively.

TABLE 5

| Tie Layer | Multilayer structure | Barrier type | Orientation | Adhesion |
|---|---|---|---|---|
| Tie Layer 3 | Structure 1 | EVOH | 12X | Film Tear (water bath at 95° C.) |
| Tie Layer 3 | Structure 2 | Ionomer | 12X | Film Tear (water bath at 95° C.) |
| Tie Layer 3 | Structure 3 | Polyamide | 6X | Inseparable (water bath at 75° C.) |

As shown in Table 5, surprisingly, the tie layers made using live, grafted HDPE reacted with an EPR are inseparable with the polar barrier films even at orientations as high as 12×. This is a significant improvement over tie layers shown in Table 6 where the tie layers were separated even before soaking in water bath.

TABLE 6

| Tie Layer | Multilayer structure | Barrier type | Orientation | Adhesion |
|---|---|---|---|---|
| Comparative Tie layer 4 | Structure 1 | EVOH | 12X | Separation (water bath at 95° C.) |
| Comparative Tie layer 5 | Structure 1 | EVOH | 12X | Separation (water bath at 95° C.) |
| Comparative Tie layer 4 | Structure 2 | Ionomer | 12X | Separation (water bath at 95° C.) |
| Comparative Tie layer 5 | Structure 2 | Ionomer | 12X | Separation (water bath at 95° C.) |

I claim:

1. An oriented multilayer structure for shrink and thin structure film applications comprising:
   a polymeric layer,
   a tie layer adhered to said polymeric layer, said tie layer comprising the reaction product of a live, grafted polyolefin and an olefin elastomer, said multilayer structure being oriented.

2. The multilayer structure of claim 1 wherein the grafted polyolefin is high-density polyethylene (HDPE) grafted with maleic anhydride.

3. The multilayer structure of claim 2, wherein the structure comprises an internal barrier layer comprising a polar polymer and two outer layers selected from the group consisting of polyolefins, ionomers, and blends thereof.

4. The multilayer structure of claim 1 wherein the olefin elastomer is ethylene-propylene rubber (EPR) or ethylene-propylene-diene monomer rubber (EPDM).

5. The multilayer structure of claim 1 wherein the multilayer structure has an orientation equal to or greater than 2X.

6. The multilayer structure of claim 1 wherein the graft composition comprises the reaction product of maleic anhydride-grafted polyethylene and an olefin elastomer, and a base resin comprising LLDPE.

7. The multilayer structure of claim 1, wherein the polymeric layer is a barrier layer comprising a polar polymer.

8. The multilayer structure of claim 7, wherein the polar polymer is selected from the group consisting of ethylene vinyl alcohol (EVOH), ethylene vinyl acetate (EVAC), polyamide(PAM) and blends thereof.

9. The multilayer structure of claim 1, wherein the polymeric layer is selected from the group consisting of polyolefins, ionomers, and blends thereof.

10. The multilayer structure of claim 1 where the total number of layers are 5, 7, 9, or 11 layers.

11. A process for preparing and orienting a multilayer structure for shrink application comprising:

preparing a polymer composition comprising the reaction product of a live, grafted polyolefin and an olefin elastomer, extruding said polymer composition with at least one other polymer layer to form the multilayer structure, and biaxially orienting said multilayer structure thereby forming a biaxially oriented multilayer structure wherein the step of biaxially orienting is performed during the extruding step or as an additional step performed after the extruding step.

12. The process of claim 11 wherein the biaxially oriented multilayer structure has an orientation equal to or greater than 2X.

13. The process of claim 11 wherein the extruding step and/or the biaxially orienting step is carried out in a bubble process.

14. The process of claim 13, wherein the biaxially orienting step is carried by mechanically stretching the multilayer structure in a first direction and a second direction transverse to said first direction.

15. The process of claim 11 wherein the grafted polyolefin is high-density polyethylene (HDPE) grafted with maleic anhydride and the olefin elastomer is ethylene-propylene rubber (EPR) or ethylene-propylene-diene monomer rubber (EPDM).

* * * * *